United States Patent
Cho et al.

(10) Patent No.: US 8,208,441 B2
(45) Date of Patent: Jun. 26, 2012

(54) METHOD OF MAPPING RESOURCE UNIT IN WIRELESS COMMUNICATION SYSTEM

(75) Inventors: Han Gyu Cho, Anyang-si (KR); Jinsoo Choi, Anyang-si (KR); Jin Sam Kwak, Anyang-si (KR); Seung Hyun Kang, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 12/604,167

(22) Filed: Oct. 22, 2009

(65) Prior Publication Data

US 2010/0165935 A1     Jul. 1, 2010

Related U.S. Application Data

(60) Provisional application No. 61/107,349, filed on Oct. 22, 2008, provisional application No. 61/109,184, filed on Oct. 29, 2008, provisional application No. 61/120,066, filed on Dec. 5, 2008, provisional application No. 61/120,490, filed on Dec. 8, 2008, provisional application No. 61/121,557, filed on Dec. 11, 2008.

(30) Foreign Application Priority Data

Sep. 11, 2009   (KR) .................. 10-2009-0085667

(51) Int. Cl.
*H04W 4/00* (2009.01)
(52) U.S. Cl. ........................................ 370/330; 375/260
(58) Field of Classification Search .................. 370/330; 375/260
See application file for complete search history.

(56) References Cited

U.S. PATENT DOCUMENTS

| | | | |
|---|---|---|---|
| 2006/0018279 A1 * | 1/2006 | Agrawal et al. | 370/330 |
| 2007/0201398 A1 | 8/2007 | Yang et al. | |
| 2007/0206559 A1 | 9/2007 | Cho et al. | |
| 2007/0217362 A1 | 9/2007 | Kashima et al. | |
| 2007/0298809 A1 | 12/2007 | So | |
| 2008/0013599 A1 | 1/2008 | Malladi | |
| 2008/0034107 A1 | 2/2008 | Lee et al. | |
| 2008/0225788 A1 | 9/2008 | Inoue et al. | |
| 2008/0227481 A1 | 9/2008 | Naguib et al. | |
| 2009/0262699 A1 * | 10/2009 | Wengerter et al. | 370/330 |
| 2010/0061345 A1 * | 3/2010 | Wengerter et al. | 370/335 |
| 2010/0068006 A1 | 3/2010 | Littlewood et al. | |
| 2010/0103894 A1 * | 4/2010 | Cho et al. | 370/329 |
| 2010/0103896 A1 * | 4/2010 | Cho et al. | 370/329 |
| 2010/0165935 A1 | 7/2010 | Cho et al. | |
| 2010/0255851 A1 * | 10/2010 | Kwak et al. | 455/450 |

FOREIGN PATENT DOCUMENTS

| | | |
|---|---|---|
| KR | 10-2007-0049091 A | 5/2007 |
| KR | 10-2008-0038967 A | 5/2008 |
| KR | 10-2008-0056616 A | 6/2008 |
| KR | 10-2008-0081537 A | 9/2008 |
| KR | 10-2008-0082943 A | 9/2008 |
| WO | WO 2007/094628 A1 | 8/2007 |
| WO | WO 2007/099839 A1 | 9/2007 |

* cited by examiner

*Primary Examiner* — Phuc Tran
(74) *Attorney, Agent, or Firm* — Birch, Stewart, Kolasch & Birch, LLP

(57) ABSTRACT

A method and an apparatus of mapping a resource unit is provided. Physical resource units (PRUs) are divided into a plurality of PRU sets. The PRUs are mapped to a subband PRU or a miniband PRU in a granularity of the PRU set. The mapping is based on the greatest common divisor of the maximum number of PRU sets. The resource unit can be effectively mapped while maximizing a frequency diversity gain of a subband PRU and a miniband PRU.

6 Claims, 13 Drawing Sheets

METHOD OF MAPPING RESOURCE UNIT IN WIRELESS COMMUNICATION SYSTEM

CROSS-REFERENCE TO RELATED APPLICATIONS

This application claims the benefit of priority of U.S. Provisional application No. 61/107,349 filed on Oct. 22, 2008, U.S. Provisional application No. 61/109,184 filed on Oct. 29, 2008, U.S. Provisional application No. 61/120,066 filed on Dec. 5, 2008, U.S. Provisional application No. 61/120,490 filed on Dec. 8, 2008, U.S. Provisional application No. 61/121,557 filed on Dec. 11, 2008, and Korean Patent Application No. 10-2009-0085667 filed on Sep. 11, 2009 all of which are incorporated by reference in their entirety herein.

BACKGROUND OF THE INVENTION

1. Field of the Invention

The present invention relates to wireless communications, and more particularly, to a method and an apparatus of mapping a resource unit.

2. Related Art

Wireless communication systems are widely spread all over the world to provide various types of communication services such as voice or data. In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

The institute of electrical and electronics engineers (IEEE) 802.16 standard provides a technique and protocol for the support of broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'. A standard based on the IEEE 802.16-2004/Cor1 is referred to as IEEE 802.16e or WiMAX.

In the IEEE 802.16 broadband wireless access working group, there is ongoing standardization effort for the IEEE 802.16m standard which is a new technical standard based on the IEEE 802.16e. The IEEE 802.16e system uses a time division duplex (TDD) scheme in which a downlink (DL) and an uplink (UL) are temporally divided, whereas the IEEE 802.16m is expected to use not only the TDD scheme but also a frequency division duplex (FDD) scheme in which the DL and the UL are spectrally divided. Furthermore, in order to improve a transfer rate, a frame of the IEEE 802.16m system is designed by considering bandwidth expansion, decrease in a cyclic prefix (CP) size, transmission in a subframe unit in which a frame is divided into a plurality of subframes, mapping of a resource unit in a multi-cell environment, etc.

A resource unit is classified into a physical resource unit (PRU) and a logical resource unit (LRU). The PRU is a basic physical unit for allocating resources including a plurality of contiguous subcarriers ? a plurality of contiguous orthogonal frequency division multiplexing (OFDM) symbols. The LRU is a basic logical unit for allocating distributed and localized resources.

Meanwhile, in a frequency domain, the resource unit may be spread along a frequency axis according to a predetermined permutation rule which is designed to obtain a frequency diversity gain. Permutation implies mapping of one set of resource units onto same-sized another set of resource units. Mapping of a resource unit is a method in which a PRU is mapped to a contiguous resource unit (CRU) and a distributed resource unit (DRU) in the frequency domain and the CRU and the DRU are allocated to a cell (or sector) specific resource by dividing the CRU and the DRU into one or more frequency partitions. Alternatively, permutation may imply an operation of allocating an index of the PRU to an index of the LRU. In this case, each index can be allocated one time. Permutation can be performed in a resource unit having a specific granularity. The less the size of the granularity, the greater the frequency diversity gain resulted from permutation.

Hereinafter, contiguous PRUs will be referred to as a PRU set or a subband. One subband includes a plurality of contiguous PRUs in the frequency domain, and is suitable for frequency selective allocation. A frequency band corresponding to one subband can be allocated to an optimal frequency channel for a user equipment. For example, one subband may include 4 contiguous PRUs. A miniband includes a less number of PRUs than the subband, and is permutated in the frequency domain. The miniband is suitable for frequency division allocation. For example, one miniband may consist of one PRU.

SUMMARY OF THE INVENTION

The present invention provides a method and an apparatus of mapping a resource unit.

According to an aspect of the present invention, a method of mapping a resource unit is provided. The method includes dividing physical resource units (PRUs) into a plurality of PRU sets; and mapping the PRUs to a subband PRU or a miniband PRU in a granularity of the PRU set, wherein the PRU set comprises a plurality of contiguous PRUs, and the mapping is based on the greatest common divisor of $N_{sub}$ and $$\left\lceil \frac{N_{sub}}{K_{SB}} \right\rceil,$$

where $N_{sub}$ denotes the maximum number of PRU sets and $K_{SB}$ denotes the number of PRU sets mapped to the subband PRU.

According to another aspect of the present invention, a data transmission method of a user equipment in a wireless communication system is provided. The method includes mapping a subband PRU to a PRU in a granularity of a PRU set; and transmitting data by using the PRU, wherein the subband PRU is allocated with at least one subband comprising a plurality of contiguous PRUs, the PRU set comprises PRUs whose total number is equal to the number of the plurality of contiguous PRUs included in one subband, and the mapping to the PRU is performed based on the maximum number of PRU sets and the number of PRU sets mapped to the subband PRU.

According to another aspect of the present invention, a data processing method of a user equipment in a wireless communication system is provided. The method includes receiving data by using a PRU; and mapping the PRU to a subband PRU in a granularity of a PRU set, wherein the subband PRU is allocated with at least one subband comprising a plurality of contiguous PRUs, the PRU set comprises PRUs whose total number is equal to the number of the plurality of contiguous PRUs included in one subband, and the mapping to the subband PRU is performed based on the maximum number of PRU sets and the number of PRU sets mapped to the subband PRU.

According to another aspect of the present invention, a user equipment is provided. The user equipment includes a processor; and a radio frequency (RF) unit, coupled to the processor, for transmitting and receiving a radio signal, wherein the processor divides physical resource units (PRUs) into a plurality of PRU sets, and maps the PRUs to a subband PRU or a miniband PRU in a granularity of the PRU set, wherein the PRU set comprises a plurality of contiguous PRUs, and the mapping is based on the greatest common divisor of $N_{sub}$ and $$\left\lceil \frac{N_{sub}}{K_{SB}} \right\rceil,$$

where $N_{sub}$ denotes the maximum number of PRU sets and $K_{SB}$ denotes the number of PRU sets mapped to the subband PRU.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Although the following description will focus on the IEEE 802.16m for clarity of explanation, the technical features of the present invention are not limited thereto.

Figure 1:
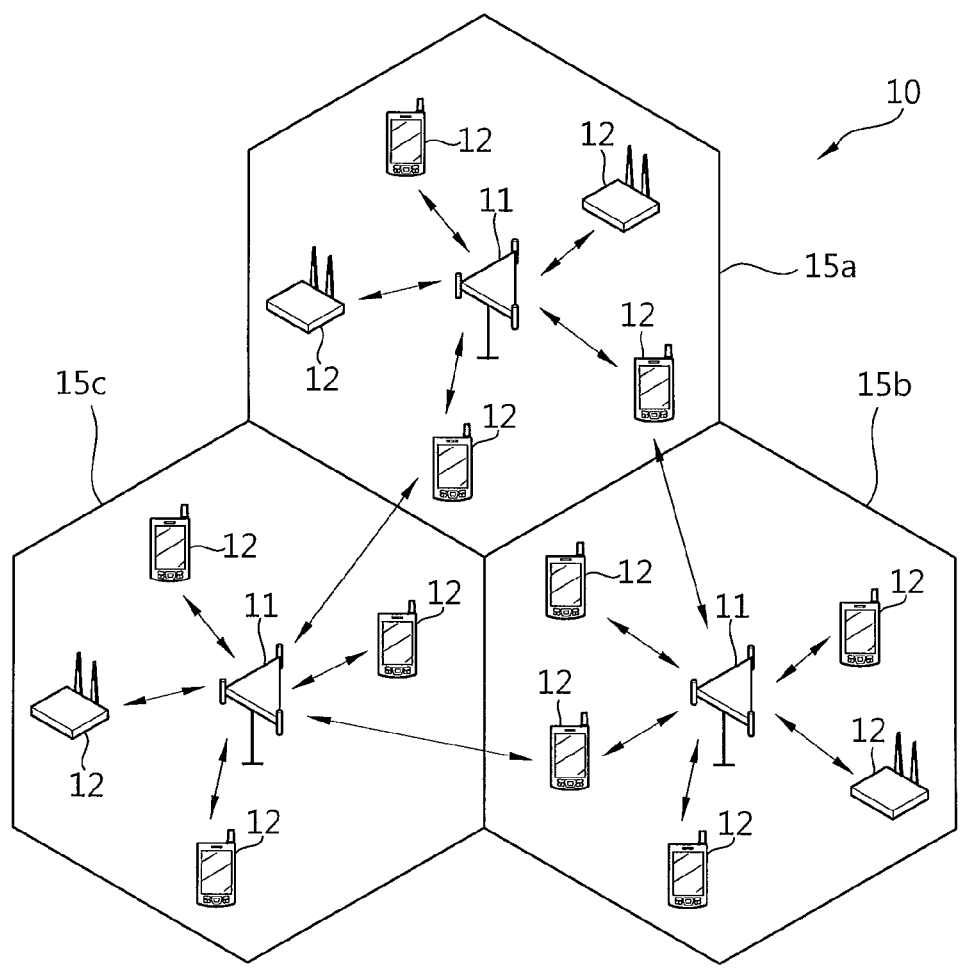
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. Each cell can be divided into a plurality of regions (referred to as sectors). A mobile station (MS) 12 may be fixed or mobile, and may be referred to as another terminology, such as a user equipment (UE), a user terminal (UT), a subscriber station (SS), a wireless device, a personal digital assistant (PDA), a wireless modem, a handheld device, etc. The BS 11 is generally a fixed station that communicates with the MS 12 and may be referred to as another terminology, such as an evolved node-B (eNB), a base transceiver system (BTS), an access point, etc.

An MS belongs to one cell. A cell to which the MS belongs is referred to as a serving cell. A BS providing a communication service to the serving cell is referred to as a serving BS. Since a wireless communication system is a cellular system, there is another cell adjacent to the serving cell. The cell adjacent to the serving cell is referred to as a neighbor cell. A BS providing a communication service to the neighbor cell is referred to as a neighbor BS. The serving cell and the neighbor cell are determined relatively with respect to the MS.

Hereinafter, downlink (DL) denotes communication from the BS to the MS, and uplink (UL) denotes communication from the MS to the BS. In the DL, a transmitter may be a part of the BS, and a receiver may be a part of the MS. In the UL, the transmitter may be a part of the MS, and the receiver may be a part of the BS.

As a duplex scheme, the wireless communication system can use a time division duplex (TDD) scheme, a frequency division duplex (FDD) scheme, or a half-duplex FDD (H-FDD) scheme.

Figure 2:
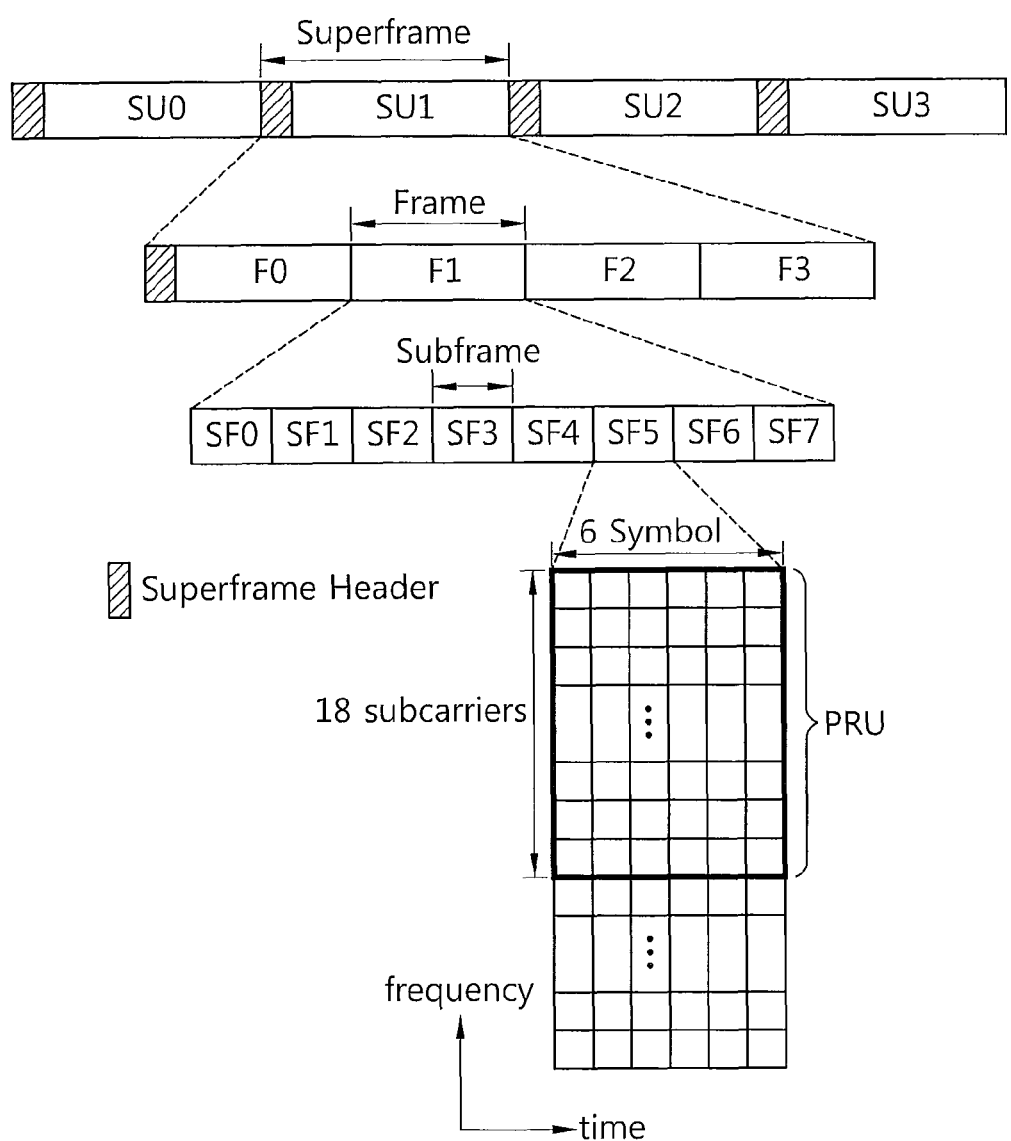
FIG. 2 shows an example of a superframe structure in an institute of electrical and electronics engineers (IEEE) 802.16m system.

FIG. 2 shows an example of a superframe structure in an IEEE 802.16m system. Referring to FIG. 2, each of superframes SU0, SU1, SU2, and SU3 includes a superframe header (SFH) and four frames F0, F1, F2, and F3. Each frame may have the same length in the superframe. For example, the superframe may have a size of 20 milliseconds (ms), and each frame may have a size of 5 ms. One frame includes 8 subframes SF0, SF1, ..., SF7. Each subframe can be allocated for DL transmission or UL transmission.

The SFH can carry an essential system parameter and system configuration information. The SFH may be located in a first subframe of the superframe. The SFH can be classified into a primary-SFH (P-SFH) and a secondary-SFH (S-SFH). The P-SFH is transmitted in every superframe. The S-SFH may be transmitted in every superframe.

The superframe structure is for exemplary purposes only. A length of the superframe, the number of frames included in the superframe, the number of subframes included in the frame, etc., may change variously. The number of subframes included in the frame may change variously according to a channel bandwidth and a cyclic prefix (CP) length.

One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. Although it is described herein that one subframe includes 6 OFDM symbols S0, S1, . . . , S5, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

One OFDM symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDM symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter.

TABLE 1

| The nominal channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf (kHz) | | | 10.94 | 7.81 | 9.77 | 10.94 | 10.94 |
| Useful symbol time, $T_b$ (μs) | | | 91.4 | 128 | 102.4 | 91.4 | 91.4 |
| CP ratio, G = 1/8 | OFDMA symbol time, $T_s$ (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| CP ratio, G = 1/16 | OFDMA symbol time, $T_s$ (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols per 5 ms frame | 50 | 35 | 44 | 50 | 50 |
| | | TTG + RTG (μs) | 142.853 | 240 | 212.8 | 142.853 | 142.853 |
| CP ratio, G = 1/4 | OFDMA symbol time, $T_s$ (μs) | | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |
| Number of Guard Sub-Carriers | Left | | 40 | 80 | 80 | 80 | 160 |
| | Right | | 39 | 79 | 79 | 79 | 159 |
| Number of Used Sub-Carriers | | | 433 | 865 | 865 | 865 | 1729 |
| Number of Physical Resource Unit (18 × 6) in a type-1 subframe. | | | 24 | 48 | 48 | 48 | 96 |

In Table 1, $N_{FFT}$ is smallest power of two greater than $N_{used}$. A sampling factor $F_s$ is floor (n·BW/8000)×8000, a subcarrier spacing Δf is $F_s/N_{FFT}$, a useful symbol time $T_b$ is 1/Δ, a CP time $T_g$ is G·$T_b$, an OFDMA symbol time $T_s$ is $T_b+T_g$, and a sampling time is $T_b/N_{FFT}$.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. For example, the number of subcarriers may be 18 in the PRU. The number of OFDM symbols included in the PRU is equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

Figure 3:
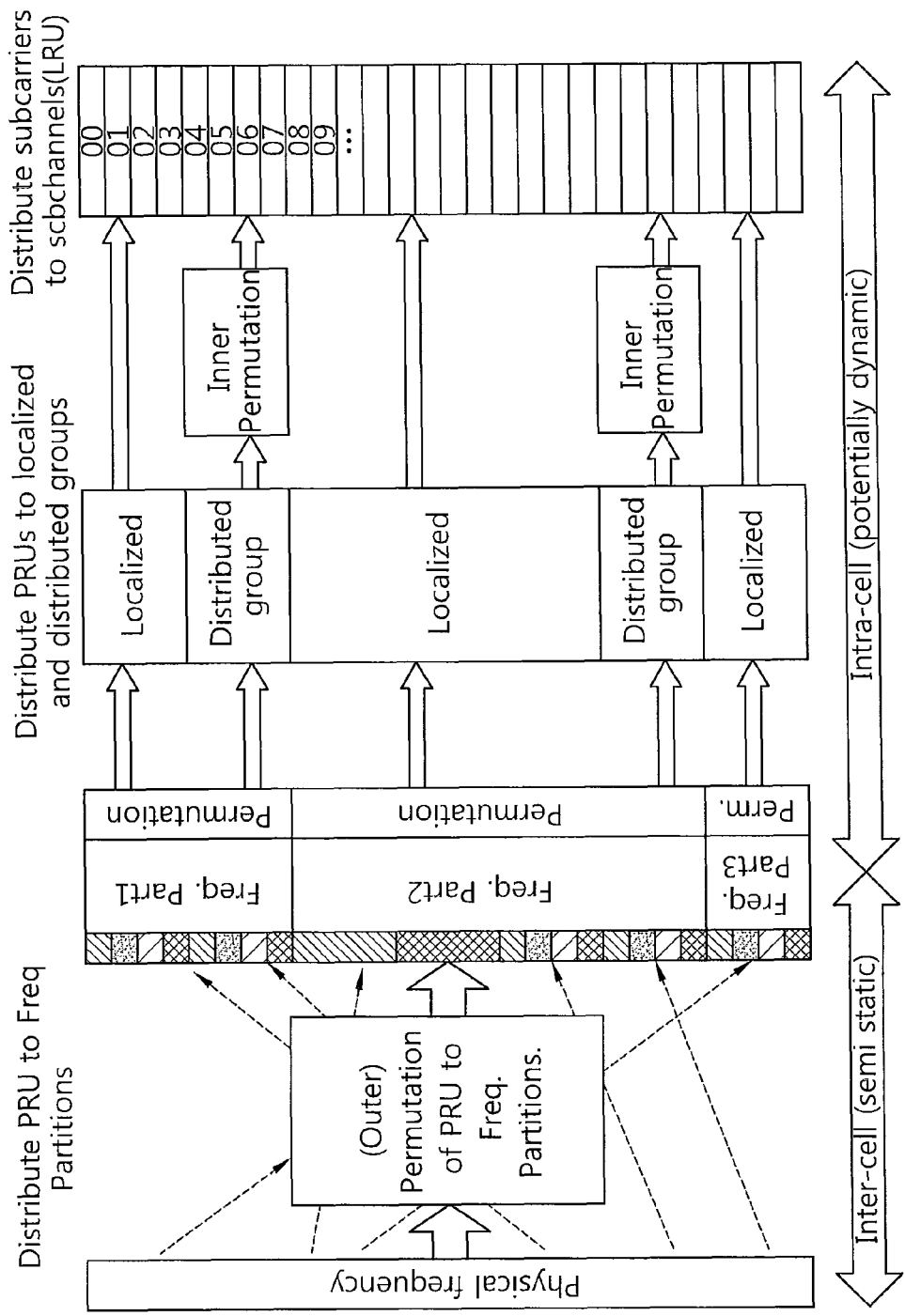
FIG. 3 shows an example of a procedure for mapping a resource unit.

FIG. 3 shows an example of a procedure for mapping a resource unit. Each PRU includes a pilot and a data subcarrier.

Referring to FIG. 3, outer permutation is performed on a physical PRU. The outer permutation is applied in a granularity of at least one PRU. The outer permutation may imply a process including a step of dividing a PRU into a subband PRU and a miniband PRU and a step of performing permutation on the miniband PRU in a PRU granularity. Hereinafter, unless otherwise specified, a PRU denotes a PRU which is not subjected to the outer permutation. In addition, a subband PRU is simply referred to as a $PRU_{SB}$, and a miniband PRU is simply referred to as a $PRU_{MB}$.

Next, a rearranged PRU is distributed to one or more frequency partitions. The frequency partition is divided into a CRU and a DRU with respect to each resource. Sector specific permutation can be supported, and direct mapping of resources can be supported for contiguous resources. A size of distributed/contiguous resource can be set flexibly for each sector.

Next, a contiguous group and a distributed group are mapped to an LRU.

Inner permutation (or subcarrier permutation) defined for distributed resource allocation in one frequency partition enables spreading of subcarriers of a distributed resource unit in all distributed resources. A granularity of the inner permutation is identical to a basic unit for constituting a distributed resource unit. If it is assumed that one distributed group has N LRUs, P permutation sequences are provided. Subchannelization for distributed resources enables spreading of subcarriers of the LRU for the all distributed resources.

There is no inner permutation for contiguous resource allocation. A PRU is directly mapped to a contiguous resource unit in each frequency partition.

Meanwhile, a fractional frequency reuse (FFR) scheme can be used in a cellular system having multiple cells. The FFR scheme divides a full frequency band into a plurality of frequency partitions (FPs), and allocates the FP to each cell. According to the FFR scheme, different FPs can be allocated between neighbor cells, and the same FP can be allocated between cells separated far from each another. Therefore, inter-cell interference (ICI) can be reduced, and performance of a user equipment located in a cell edge can be increased.

Figure 4:
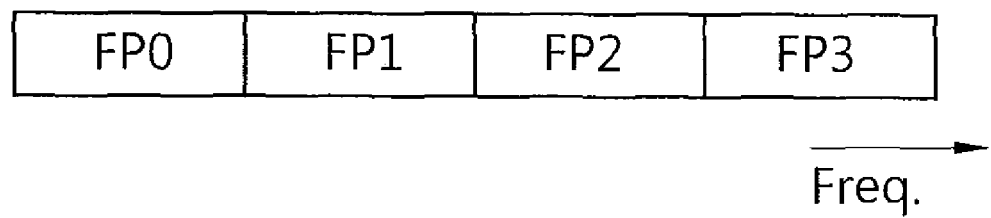
FIG. 4 shows an example of a method of dividing a full frequency band into a plurality of frequency partitions.

FIG. 4 shows an example of a method of dividing a full frequency band into a plurality of FPs.

Referring to FIG. 4, the full frequency band is divided into a first FP (i.e., FP0), a second FP (i.e., FP1), a third FP (i.e., FP2), and a fourth FP (i.e., FP3). Each FP can be physically or logically divided from the full frequency band.

Figure 5:
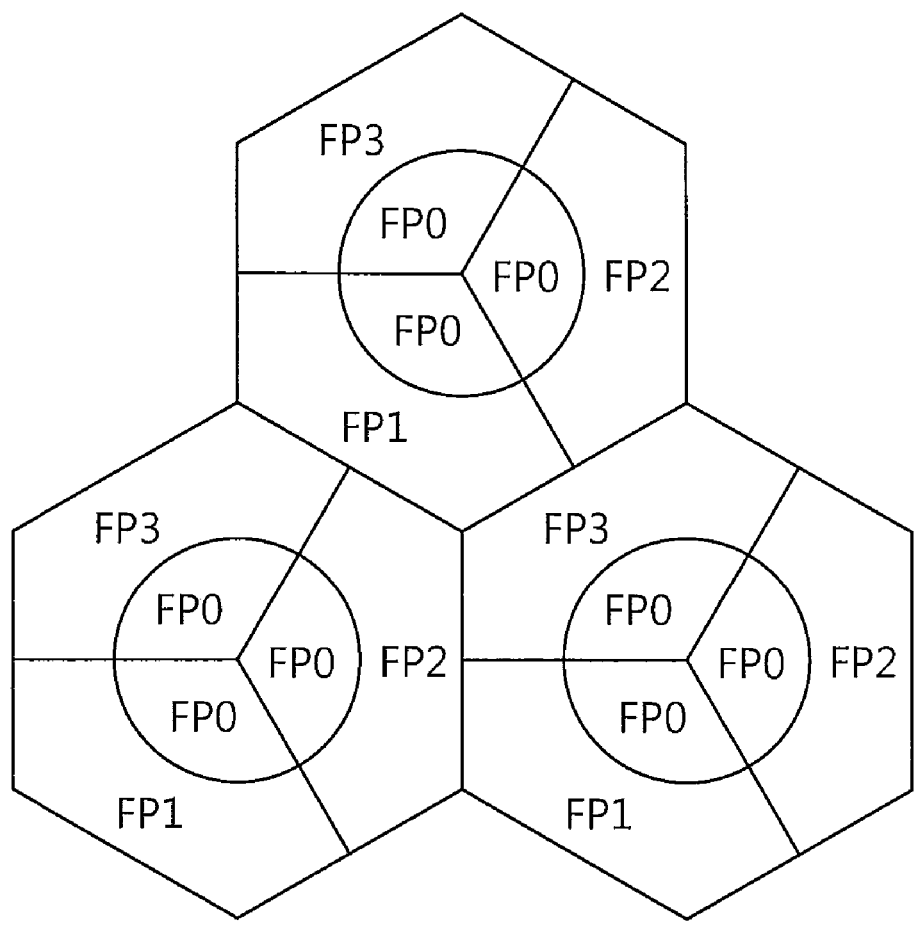
FIG. 5 shows an example of a cellular system using a fractional frequency reuse (FFR) scheme.

FIG. 5 shows an example of a cellular system using an FFR scheme.

Referring to FIG. 5, each cell is divided into an inner cell and a cell edge. Further, each cell is divided into three sectors. It is assumed that a full frequency band is divided into three FPs (i.e., FP1, FP2, and FP3), and a first FP (i.e., FP0) consists of the second FP (i.e., FP1), the third PF (i.e., FP2), and the fourth FP (i.e., FP3). That is, the first FP (i.e., FP0) is identical to the full frequency band.

The first FP (i.e., FP0) is allocated in the inner cell. Any one of the second FP (i.e., FP1) to the fourth FP (i.e., FP3) is allocated in each sector of the cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third FP (i.e., FP2) and the fourth FP (i.e., FP3) are inactive FPs.

A frequency reuse factor (FRF) can be defined as the number of cells (or sectors) into which the full frequency band can be divided. In this case, the FRF may be 1 in the inner cell, and may be 3 in each sector of the cell edge.

Figure 6:
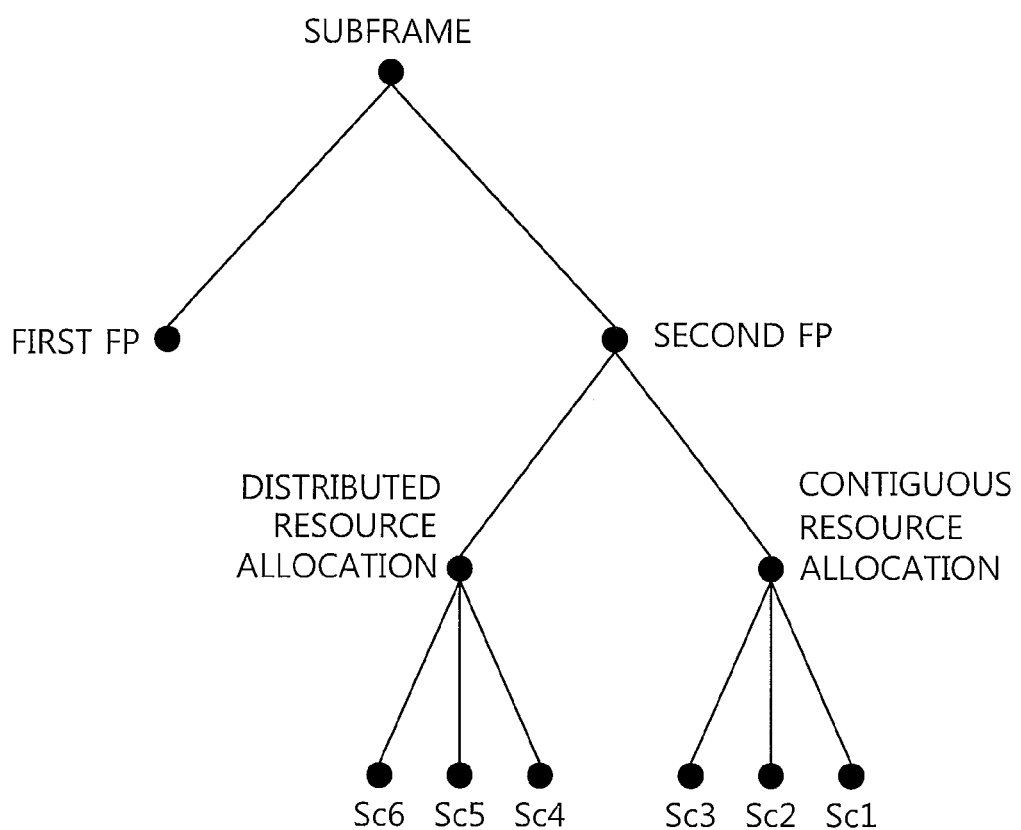
FIG. 6 shows an example of a physical structure of an uplink subframe in an IEEE 802.16m system.

FIG. 6 shows an example of a physical structure of an uplink subframe in an IEEE 802.16m system.

Referring to FIG. 6, an uplink subframe can be divided into at least one frequency partition (FP). Herein, the subframe is divided into two FPs (i.e., FP1 and FP2) for example. However, the number of FPs included in the subframe is not limited thereto. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier. A logical resource unit (LRU) is a basic logical unit for the distributed resource allocation and the contiguous resource allocation.

A distributed (non-contiguous) resource unit (DRU) includes a subcarrier group spread across distributed resource allocation in one FP. A size of the DRU is the same as a size of a PRU. A contiguous (localized) resource unit (CRU) includes a subcarrier group contiguous across resource allocation in one FP. A size of the CRU is the same as the size of the PRU.

Figure 7:
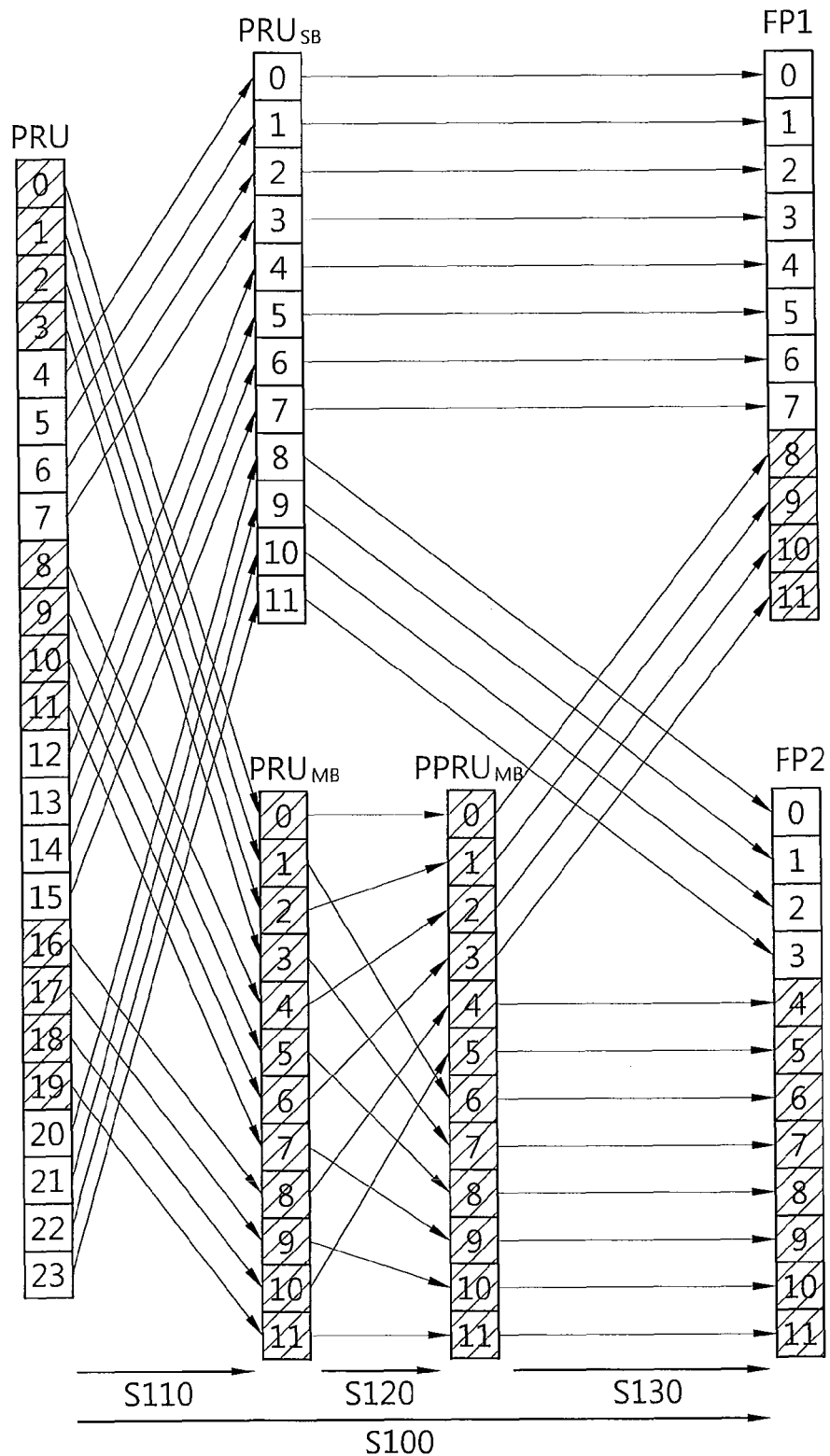
FIG. 7 shows an example of a method of mapping between a physical resource unit (PRU) and a frequency partition.

FIG. 7 shows an example of a method of mapping between a PRU and an FP.

Referring to FIG. 7, a subframe includes 24 PRUs in a frequency domain. The 24 PRUs are divided into two FPs, i.e., FP1 and FP 2 (step S100). The PRUs are divided into subbands and minibands according to a predetermined resource mapping rule (step S110). A subband is a granularity of contiguous PRUs in the frequency domain or a basic unit for constituting a CRU. A size of the subband in the frequency domain may be 4 PRUs. A miniband is a granularity of a distributed PRU or a unit for constituting a DRU. A size of the miniband in the frequency domain may be one PRU or an integer multiple of the PRU. A PRU may be allocated to a subband and a miniband by being selected in a granularity of 4 PRUs, i.e., the size of the subband. A PRU belonging to the subband (i.e., a subband PRU) is referred to as a $PRU_{SB}$, and a PRU belonging to the miniband (i.e., a miniband PRU) is referred to as a $PRU_{MB}$. The number of PRUs is equal to a sum of the number of $PRU_{SB}$s and the number of $PRU_{MB}$s. The $PRU_{SB}$ of the subband is numbered from 0 to (the number of $PRU_{SB}$s−1). The $PRU_{SB}$ of the miniband is numbered from 0 to (the number of $PRU_{SB}$s−1).

The $PRU_{MB}$ of the miniband is subjected to miniband permutation so that it can be permutated in the frequency domain in order to guarantee frequency diversity in each FP (step S120). That is, the numbered $PRU_{MB}$ is permutated according to a predetermined permutation (or mapping) rule and thus becomes a permutated $PRU_{MB}$ ($PPRU_{MB}$).

Some PRUs of the $PRU_{SB}$ and some PRUs of the $PRU_{MB}$ are mapped to a first FP, i.e., FP1. The remaining PRUs of the $PRU_{SB}$ and the remaining PRUs of the $PRU_{MB}$ other than the PRUs mapped to the FP1 are mapped to a second FP, i.e., FP2 (step S130). Thereafter, CRU/DRU allocation is performed for each FP.

Figure 8:
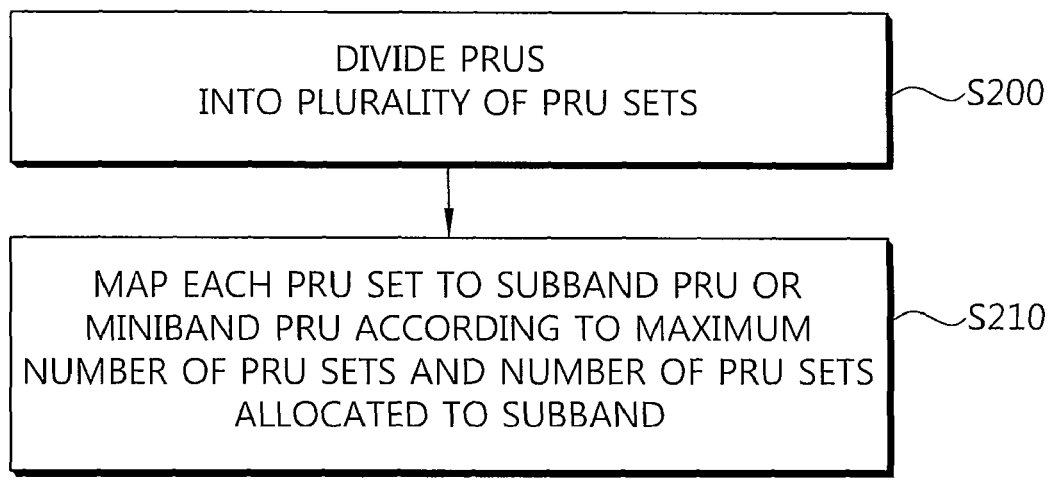
FIG. 8 is a flowchart showing a method of mapping a resource unit according to an embodiment of the present invention.

FIG. 8 is a flowchart showing a method of mapping a resource unit according to an embodiment of the present invention.

Referring to FIG. 8, PRUs are divided into a plurality of PRU sets in a full frequency band (step S200). Each PRU set includes at least one PRU. For example, each PRU set may include $N_1$ PRUs. Each PRU set may be allocated for a subband or a miniband. One subband may include $N_1$ contiguous PRUs. One miniband may include $N_2$ contiguous PRUs. For example, $N_1$ may be 4 (or 8 if an FFT size is 2048), and $N_2$ may be 1 (or 2 if an FFT size is 2048). The subband is suitable for frequency selective allocation since contiguous PRUs are allocated in a frequency domain. The miniband includes distributed PRUs, and is suitable for frequency diversity allocation.

Each PRU set is mapped to a subband PRU or a miniband PRU (Step S210). In this case, mapping can be performed on the basis of the maximum number of PRU sets in the full frequency band and the number of PRU sets allocated to the subband, that is, the number of PRU sets mapped to a subband PRU. That is, mapping can be performed on the basis of the greatest common divisor of the maximum number of PRU sets and ceil (the maximum number of PRU sets/the number of PRU sets mapped to the subband PRU).

Hereinafter, a method of mapping a resource unit will be described in detail. First, a method of mapping a subband will be described.

Figure 9:
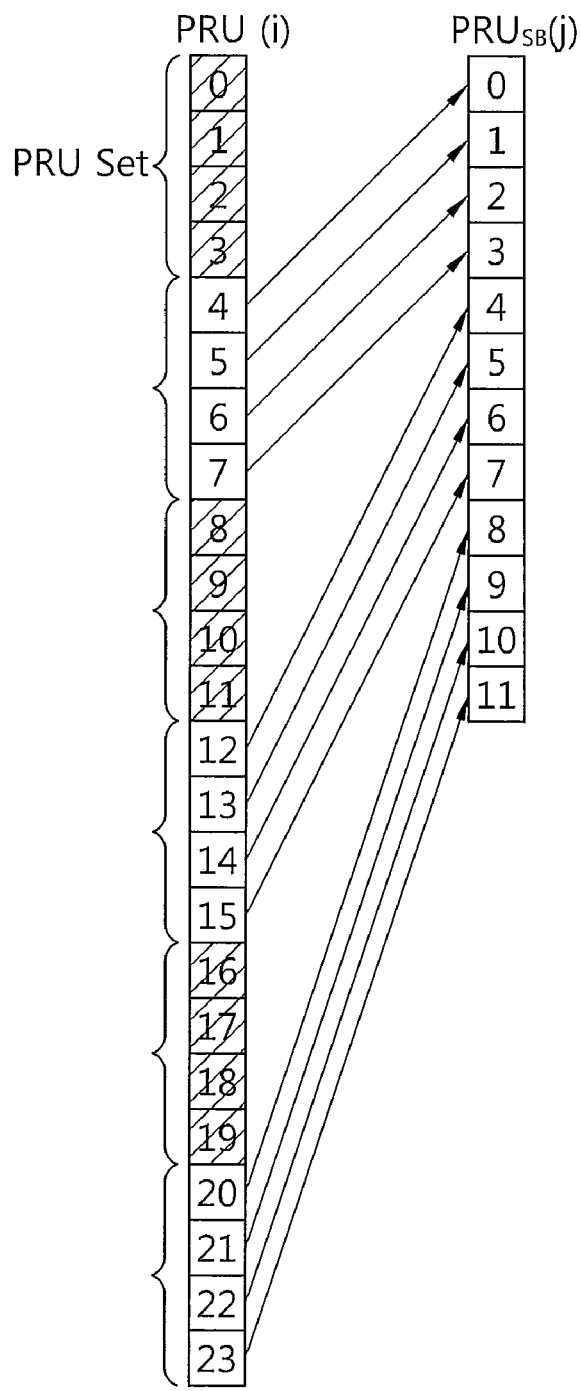
FIG. 9 shows an example of a method of mapping a PRU to a subband PRU according to an embodiment of the present invention.

FIG. 9 shows an example of a method of mapping a PRU to a subband PRU according to an embodiment of the present invention. It this example, BW is 5 MHz, and 24 PRUs are included.

Referring to FIG. 9, the 24 PRUs are divided into a plurality of PRU sets. Each PRU set may include $N_1$ contiguous PRUs. Some of the plurality of PRU sets are allocated to a subband, and are mapped to a subband PRU (i.e., $PRU_{SB}$). The number of PRU sets allocated to the subband is indicated by $K_{SB}$, and the total number of PRUs allocated to the subband is indicated by $L_{SB}$. Therefore, $L_{SB}=N_1*K_{SB}$. The subband PRU is numbered from 0 to ($L_{SB}-1$). For example, if $N_1=4$ and $K_{SB}=3$, then $L_{SB}=12$, When performing mapping between a PRU and a subband PRU, mapping is achieved such that PRU sets allocated to subbands are separated as far as possible in a frequency domain. Accordingly, a frequency diversity gain can be obtained. For example, as shown in FIG. 9, indices 0 to 3 of the $PRU_{SB}$ may be mapped to indices 0 to 3 of the PRU, indices 4 to 7 of the $PRU_{SB}$ may be mapped to indices 8 to 11 of the PRU, and indices 8 to 11 of the $PRU_{SB}$ may be mapped to indices 16 to 19 of the PRU.

Equation 1 below shows a method of mapping a PRU to a $PRU_{SB}$.

$$PRU_{SB}[j]=PRU[i], j=0, 1, \ldots, L_{SB}-1 \quad \text{[Equation 1]}$$

i can be expressed by Equation 2 below.

$$i = N_1 \cdot \left\{ \left\lceil \frac{N_{sub}}{K_{SB}} \right\rceil \cdot \left\lfloor \frac{j}{N_1} \right\rfloor + \left\lfloor \left\lfloor \frac{j}{N_1} \right\rfloor \cdot \frac{GCD\left(N_{sub}, \left\lceil \frac{N_{sub}}{K_{SB}} \right\rceil\right)}{N_{sub}} \right\rfloor \right\} \quad \text{[Equation 2]}$$

$$\mod\{N_{sub}\} + \{j\}\mod\{N_1\}$$

Herein, i denotes an index of a PRU, and j denotes an index of a subband PRU. $L_{SB}$ denotes the number of PRUs allocated for a subband. $N_1$ denotes the number of PRUs included in one subband. $N_{sub}$ denotes the maximum number of available subbands, that is, $N_{PRU}/N_1$. $K_{SB}$ denotes the number of subbands allocated to the subband. $N_{PRU}$ denotes the total number of PRUs. GCD(a, b) denotes the greatest common divisor of a and b. $\lceil\ \rceil$ denotes a ceil function, and $\lfloor\ \rfloor$ denotes a floor function. The ceil function returns a rounded up value of a specified number, and the floor function returns a rounded down value of a specified number. For example, in FIG. 9, $N_1=4$, $N_{sub}=6$, $K_{SB}=3$. In this case, if the index j of the subband PRU is 1, the index i of the PRU is mapped to 1. If the index j of the subband PRU is 4, the index i of the PRU is mapped to 8. If the index j of the subband PRU is 11, the index i of the PRU is mapped to 19.

In addition thereto, i can be expressed by Equations 3 to 6 below.

$$i = N_1 \cdot \left\{ \min\left(\left\lceil \frac{N_{sub}}{K_{SB}} \right\rceil, \frac{N_{sub}}{3}\right) \cdot \left\lfloor \frac{j}{N_1} \right\rfloor + \left\lfloor \left\lfloor \frac{j}{N_1} \right\rfloor \cdot \frac{GCD\left(N_{sub}, \min\left(\left\lceil \frac{N_{sub}}{K_{SB}} \right\rceil, \frac{N_{sub}}{3}\right)\right)}{N_{sub}} \right\rfloor \right\} \quad \text{[Equation 3]}$$

$$\mod\{N_{sub}\} + \{j\}\mod\{N_1\}$$

$$i = N_1 \cdot \left\{ \min\left(\left\lceil \frac{N_{sub}}{K_{SB}} \right\rceil, \frac{N_{sub}}{4}\right) \cdot \left\lfloor \frac{j}{N_1} \right\rfloor + \left\lfloor \left\lfloor \frac{j}{N_1} \right\rfloor \cdot \frac{GCD\left(N_{sub}, \min\left(\left\lceil \frac{N_{sub}}{K_{SB}} \right\rceil, \frac{N_{sub}}{4}\right)\right)}{N_{sub}} \right\rfloor \right\} \quad \text{[Equation 4]}$$

$$\mod\{N_{sub}\} + \{j\}\mod\{N_1\}$$

$$i = N_1 \cdot \left\{ \left\lceil \frac{N_{sub}}{\max(K_{SB}, 3)} \right\rceil \cdot \left\lfloor \frac{j}{N_1} \right\rfloor + \left\lfloor \left\lfloor \frac{j}{N_1} \right\rfloor \cdot \frac{GCD\left(N_{sub}, \left\lceil \frac{N_{sub}}{\max(K_{SB}, 3)} \right\rceil\right)}{N_{sub}} \right\rfloor \right\} \quad \text{[Equation 5]}$$

$$\mod\{N_{sub}\} + \{j\}\mod\{N_1\}$$

$$i = N_1 \cdot \left\{ \left\lceil \frac{N_{sub}}{\max(K_{SB}, 4)} \right\rceil \cdot \left\lfloor \frac{j}{N_1} \right\rfloor + \left\lfloor \left\lfloor \frac{j}{N_1} \right\rfloor \cdot \frac{GCD\left(N_{sub}, \left\lceil \frac{N_{sub}}{\max(K_{SB}, 4)} \right\rceil\right)}{N_{sub}} \right\rfloor \right\} \quad \text{[Equation 6]}$$

$$\mod\{N_{sub}\} + \{j\}\mod\{N_1\}$$

In Equations 3 to 6, i denotes an index of a PRU, and j denotes an index of a subband PRU. $L_{SB}$ denotes the number of PRUs allocated for a subband PRU. $N_1$ denotes the number of PRUs included in one subband. $N_{sub}$ denotes the maximum number of available subbands, that is, $N_{PRU}/N_1$. $K_{SB}$ denotes the number of subbands allocated to the subband.

Accordingly, when an interval between subbands is maintained to be separated as far as possible in a full frequency band, a frequency diversity gain can be obtained to the maximum extent. In particular, by using Equation 1 and Equation 2, the frequency diversity gain can be obtained to the maximum extent according to the number $K_{SB}$ of PRU sets allocated to a subband.

Next, a method of mapping a miniband PRU will be described.

Figure 10:
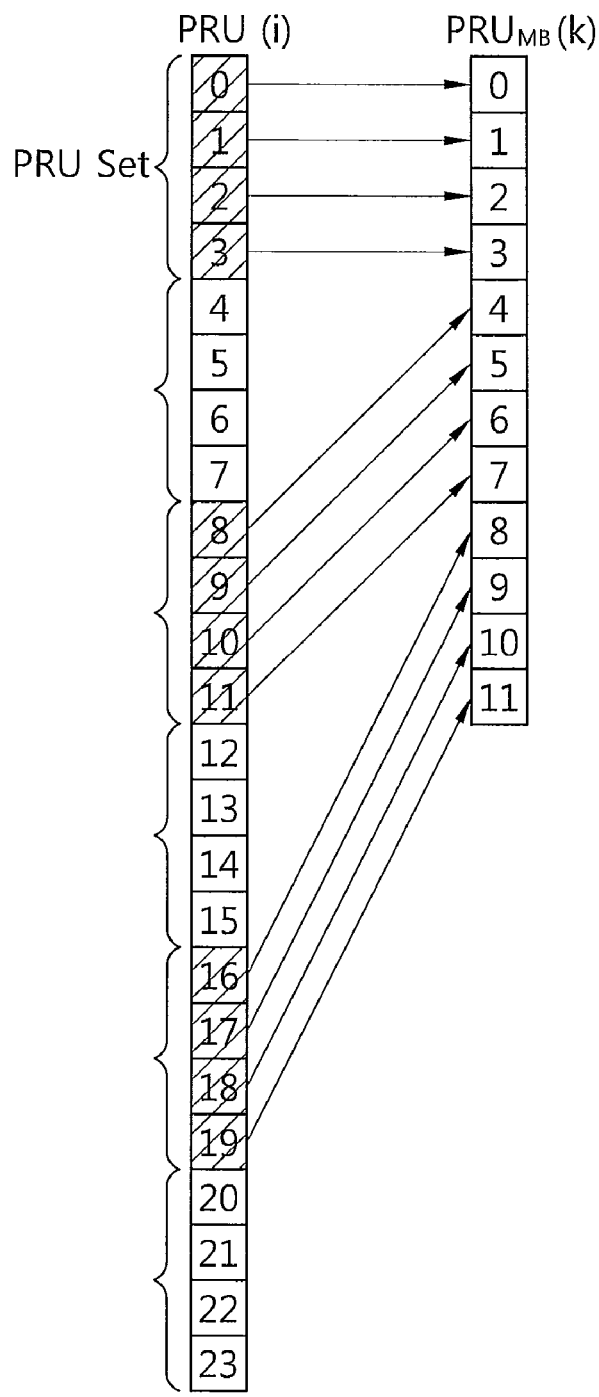
FIG. 10 shows an example of a method of mapping a PRU to a miniband PRU according to an embodiment of the present invention.

FIG. 10 shows an example of a method of mapping a PRU to a miniband PRU according to an embodiment of the present invention. It this example, BW is 5 MHz, and 24 PRUs are included.

Referring to FIG. 10, the 24 PRUs are divided into a plurality of PRU sets. Each PRU set may include $N_1$ contiguous PRUs. Some of the plurality of PRU sets are mapped to a subband, and the remaining parts thereof are allocated to a miniband. A PRU set allocated to the subband is mapped to a subband PRU (i.e., $PRU_{SB}$). A PRU set allocated to the miniband is mapped to a miniband PRU (i.e., $PRU_{MB}$). One subband includes $N_1$ contiguous PRUs. One miniband includes $N_2$ PRUs. $N_1$ may be a multiple of $N_2$. $N_1$ PRUs may be contiguously allocated for the miniband. The number of PRU sets allocated to the subband is indicated by $K_{SB}$, and the total number of PRUs allocated to the subband is indicated by $L_{SB}$. The number of minibands is indicated by $K_{MB}$, and the number of PRUs allocated to the miniband is indicated by $L_{MB}$. That is, $L_{MB}=N_2 * K_{MB}$. The miniband PRU is numbered from 0 to $L_{MB}-1$. The total number of PRUs is $N_{PRU}=L_{SB}+L_{MB}$. As shown in FIG. 10, indices 0 to 3 of the $PRU_{MB}$ may be mapped to indices 0 to 3 of the PRU, indices 4 to 7 of the $PRU_{MB}$ may be mapped to indices 8 to 11 of the PRU, and indices 8 to 11 of the $PRU_{MB}$ may be mapped to indices 16 to 19 of the PRU.

Equation 7 below shows a method of mapping a PRU to a $PRU_{MB}$.

$$PRU_{MB}[k]=PRU[i], k=0, 1, \ldots, L_{MB}-1 \quad \text{[Equation 7]}$$

i can be expressed by Equation 8 below.

$$i = \begin{cases} N_1 \cdot \left\{ \left\lceil \frac{N_{sub}}{K_{SB}} \right\rceil \cdot \left\lfloor \frac{k+L_{SB}}{N_1} \right\rfloor + \left\lfloor \left\lfloor \frac{k+L_{SB}}{N_1} \right\rfloor \cdot \frac{GCD\left(N_{sub}, \left\lceil \frac{N_{sub}}{K_{SB}} \right\rceil\right)}{N_{sub}} \right\rfloor \right\} \\ \quad \mod\{N_{sub}\} + \{k+L_{SB}\}\mod\{N_1\}, \quad K_{SB} > 0 \\ k, \quad K_{SB} = 0 \end{cases} \quad \text{[Equation 8]}$$

Herein, i denotes an index of a PRU, and k denotes an index of a miniband PRU. $L_{SB}$ denotes the number of PRUs allocated for a subband PRU. $N_1$ denotes the number of PRUs included in one subband. $N_{sub}$ denotes the maximum number of PRU sets, that is, $N_{PRU}/N_1$. $K_{SB}$ denotes the number of PRU sets allocated to the subband. For example, in a case where $N_1=4$, $N_{sub}=6$, $K_{SB}=3$, if an index k of a miniband PRU is 0, the index i of the PRU is mapped to 4. If the index k of the miniband PRU is 5, the index i of the PRU is mapped to 13. If the index k of the miniband PRU is 10, the index i of the PRU is mapped to 22.

In addition thereto, i can be expressed by Equations 9 to 10 below.

$$i = N_1 \cdot \left\{ \left\lceil \frac{N_{sub}}{\max(K_{SB}, 3)} \right\rceil \cdot \left\lfloor \frac{k+L_{SB}}{N_1} \right\rfloor + \left\lfloor \left\lfloor \frac{k+L_{SB}}{N_1} \right\rfloor \cdot \frac{GCD\left(N_{sub}, \left\lceil \frac{N_{sub}}{\max(K_{SB}, 3)} \right\rceil\right)}{N_{sub}} \right\rfloor \right\} \quad \text{[Equation 9]}$$

$$\mod\{N_{sub}\} + \{k+L_{SB}\}\mod\{N_1\}$$

$$i = N_1 \cdot \left\{ \left\lceil \frac{N_{sub}}{\max(K_{SB}, 4)} \right\rceil \cdot \left\lfloor \frac{k+L_{SB}}{N_1} \right\rfloor + \left\lfloor \left\lfloor \frac{k+L_{SB}}{N_1} \right\rfloor \cdot \frac{GCD\left(N_{sub}, \left\lceil \frac{N_{sub}}{(K_{SB}, 4)} \right\rceil\right)}{N_{sub}} \right\rfloor \right\} \quad \text{[Equation 10]}$$

$$\mod\{N_{sub}\} + \{k+L_{SB}\}\mod\{N_1\}$$

In Equations 9 to 10, i denotes an index of a PRU, and k denotes an index of a miniband PRU. $L_{SB}$ denotes the number of PRUs allocated for a subband PRU. $N_1$ denotes the number of PRUs included in one subband or PRU set. $N_{sub}$ denotes the maximum number of PRU sets, that is, $N_{PRU}/N_1$. $K_{SB}$ denotes the number of PRU sets allocated to the subband.

Hereinafter, a method of transmitting and receiving data by using the aforementioned method of mapping a resource unit will be described.

Figure 11:
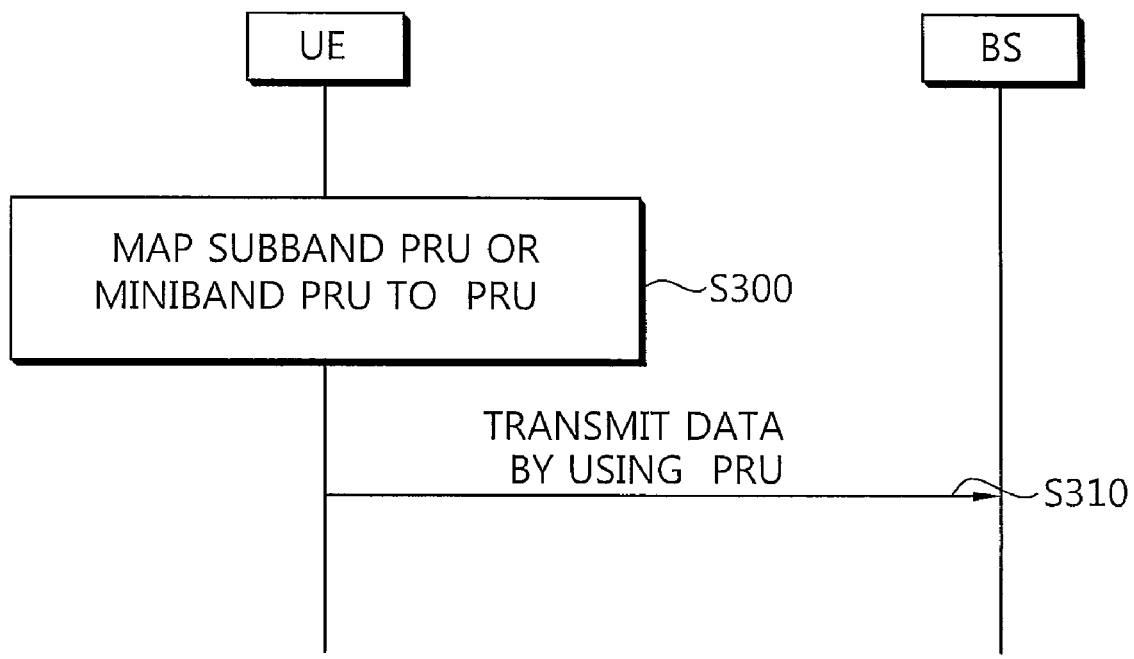
FIG. 11 is a flowchart showing a data transmission method according to an embodiment of the present invention.

FIG. 11 is a flowchart showing a data transmission method according to an embodiment of the present invention.

Referring to FIG. 11, a UE maps subband PRUs and miniband PRUs to a PRU in a granularity of a PRU set (step S300). A subband for frequency selective allocation includes $N_1$ contiguous PRUs. A miniband for obtaining frequency diversity gain includes $N_2$ PRUs. The number of PRUs included in the PRU set may be equal to the number of PRUs included in the subband. Therefore, $N_1$ may be a multiple of $N_2$. In this case, mapping can be performed on the basis of the maximum number of PRU sets in a full frequency band and the number of PRU sets allocated to the subband. For example, mapping can be performed on the basis of the greatest common divisor of the maximum number of PRU sets and ceil (the maximum number of PRU sets/the number of PRU sets mapped to the subband). More specifically, the subband PRU can be mapped to the PRU according to Equation 1 to Equation 6. The miniband PRU can be mapped to the PRU according to Equation 7 to Equation 10.

The UE transmits uplink data to a BS by using the PRU (step S310).

Figure 12:
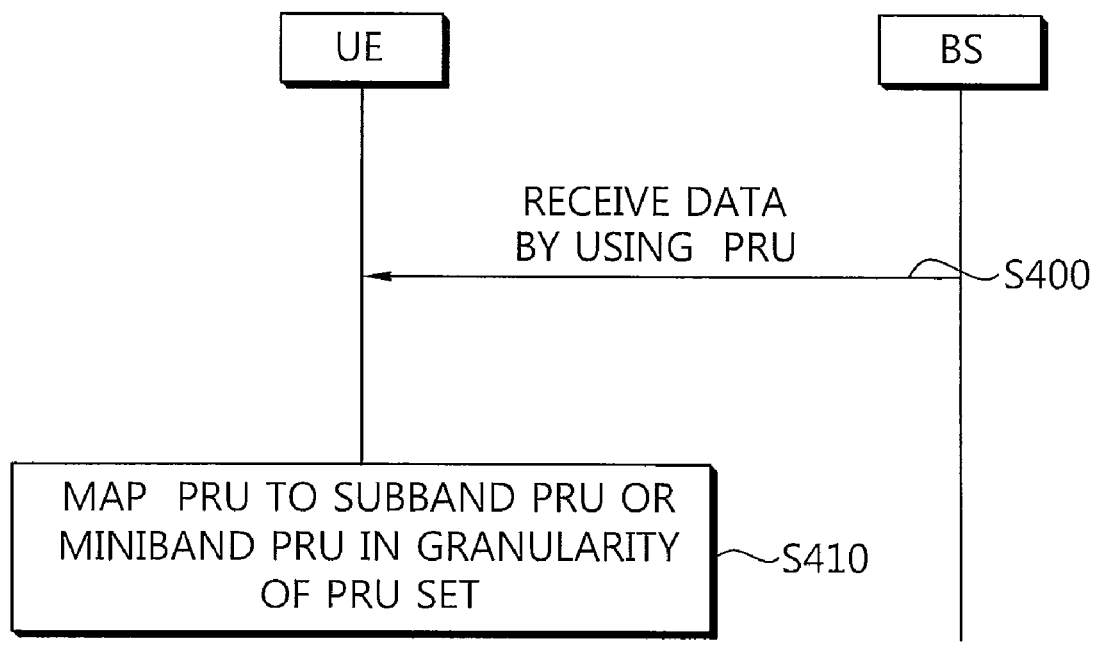
FIG. 12 is a flowchart showing a data processing method according to an embodiment of the present invention.

FIG. 12 is a flowchart showing a data processing method according to an embodiment of the present invention.

Referring to FIG. 12, a UE receives downlink data from a BS by using a PRU (step S400). The UE maps the PRU to a subband PRU and a miniband PRU (step S410). The PRU is divided into a plurality of PRU sets, and is mapped to the subband PRU or the miniband PRU in a granularity of a PRU set. A subband may include N1 contiguous PRUs, and a miniband may include N2 PRUs. The number of PRUs included in one subband is equal to the number of PRUs included in one PRU set. N1 may be a multiple of N2. In this case, mapping can be performed on the basis of the maximum number of PRU sets in a full frequency band and the number of PRU sets allocated to the subband. For example, mapping can be performed on the basis of the greatest common divisor of the maximum number of PRU sets and ceil (the maximum number of PRU sets/the number of PRU sets mapped to the subband). More specifically, mapping to the subband PRU can be performed according to Equation 1 to Equation 6, and mapping to the miniband PRU can be performed according to Equation 7 to Equation 10.

Figure 13:
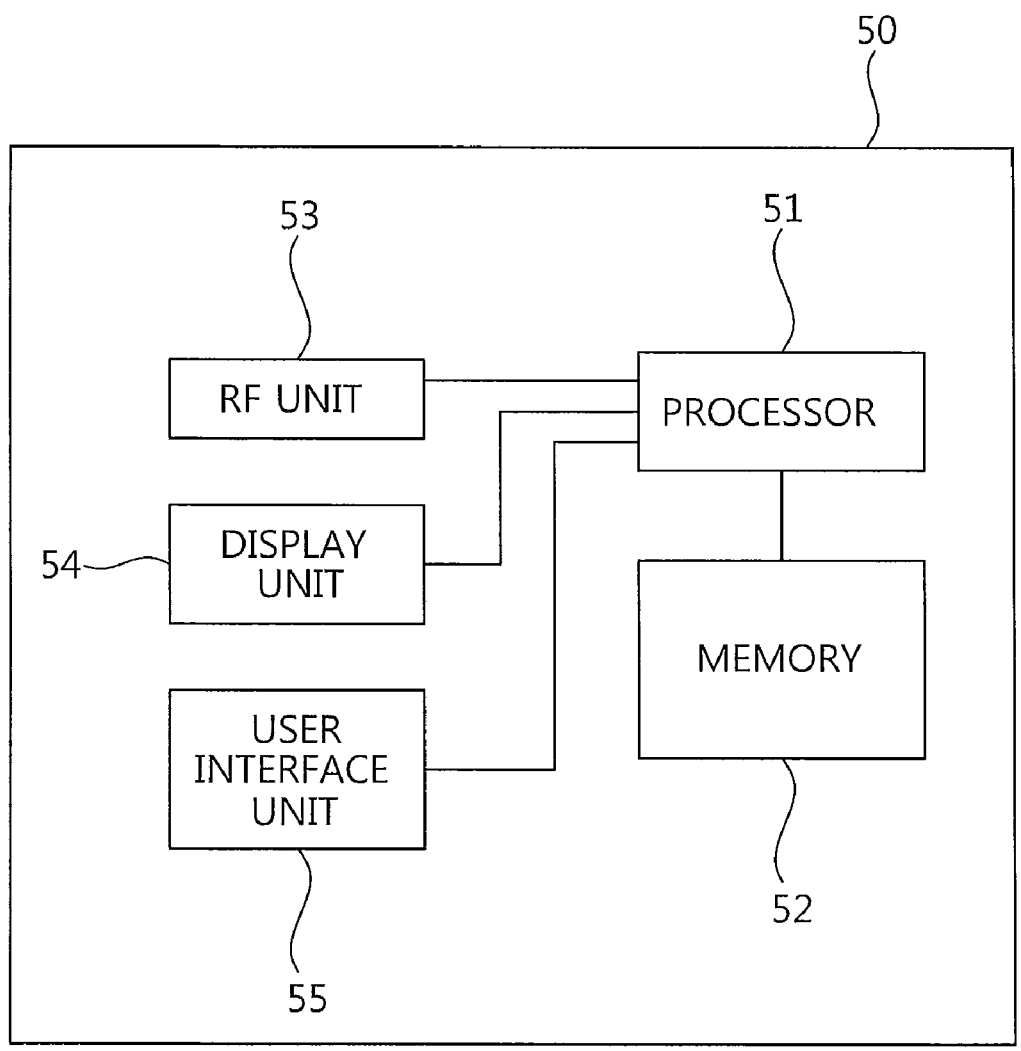
FIG. 13 is a block diagram showing a user equipment according to an embodiment of the present invention.

FIG. 13 is a block diagram showing a UE according to an embodiment of the present invention.

Referring to FIG. 13, a UE 50 includes a processor 51, a memory 52, a radio frequency (RF) unit 53, a display unit 54, and a user interface unit 55. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The processor 51 is configured to perform a step of dividing physical resource units (PRUs) into a plurality of PRU sets, and a step of mapping the PRUs to a subband PRU or a miniband PRU in a granularity of the PRU set. In this case, a subband includes a plurality of contiguous PRUs, a miniband includes at least one PRU, and the mapping is based on the greatest common divisor of the maximum number of PRU sets and ceil (the maximum number of PRU sets/the number of PRU sets mapped to the subband).

According to the proposed techniques, the resource unit can be effectively mapped while maximizing a frequency diversity gain of a subband physical resource unit (PRU) and a miniband PRU with respect to various system environments and parameters.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the protection.

What is claimed is:

1. A method of mapping a resource unit, the method comprising:

dividing physical resource units (PRUs) into a plurality of PRU sets; and mapping the PRUs to a subband PRU or a miniband PRU in a granularity of the PRU set, wherein the PRU set comprises a plurality of contiguous PRUs, and the mapping is based on the greatest common divisor of $N_{sub}$ and value x, where $N_{sub}$ denotes the maximum number of PRU sets and the value x is based on $K_{SB}$ which denotes the number of PRU sets mapped to the subband PRU.

2. The method of claim 1, wherein the mapping to the subband PRU is based on Equation (E-1):

$$PRU_{SB}[j]=PRU[i], j=0, 1, \ldots, L_{SB}-1 \qquad (E-1)$$

where i can be expressed by Equation (E-2):

$$i = N_1 \cdot \left\{ \left\lceil \frac{N_{sub}}{K_{SB}} \right\rceil \cdot \left\lfloor \frac{j}{N_1} \right\rfloor + \left\lfloor \left\lfloor \frac{j}{N_1} \right\rfloor \cdot \frac{GCD\left(N_{sub}, \left\lceil \frac{N_{sub}}{K_{SB}} \right\rceil\right)}{N_{sub}} \right\rfloor \right\} \mod\{N_{sub}\} + \qquad (E-2)$$

$$\{j\}\mod\{N_1\},$$

where i denotes an index of a PRU, j denotes an index of a subband PRU, $L_{SB}$ denotes the number of PRUs mapped to the subband PRU, and $N_1$ denotes the number of PRUs included in one PRU set.

3. The method of claim 1, wherein the mapping to the miniband PRU is based on Equation (E-3):

$$PRU_{MB}[k]=PRU[i], k=0, 1, \ldots, L_{MB}-1 \qquad (E-3),$$

where i can be expressed by Equation (E-4):

$$i = \begin{cases} N_1 \cdot \left\{ \left\lceil \frac{N_{sub}}{K_{SB}} \right\rceil \cdot \left\lfloor \frac{k+L_{SB}}{N_1} \right\rfloor + \right. & K_{SB} > 0 \\ \left. \left\lfloor \left\lfloor \frac{k+L_{SB}}{N_1} \right\rfloor \cdot \frac{GCD\left(N_{sub}, \left\lceil \frac{N_{sub}}{K_{SB}} \right\rceil\right)}{N_{sub}} \right\rfloor \right\} & \\ \mod\{N_{sub}\} + \{k+L_{SB}\}\mod\{N_1\}, & \\ k, & K_{SB} = 0, \end{cases} \qquad (E-4)$$

where i denotes an index of a PRU, k denotes an index of a miniband PRU, $L_{MB}$ denotes the number of PRUs mapped to a miniband PRU, $N_1$ denotes the number of PRUs included in one PRU set, $N_{sub}$ denotes the maximum number of PRU sets, and $K_{SB}$ denotes the number of PRU sets mapped to the subband PRU.

4. A data transmission method of a user equipment in a wireless communication system, the method comprising:

mapping a subband PRU to a PRU in a granularity of a PRU set; and transmitting data by using the PRU, wherein the subband PRU is allocated with at least one subband comprising a plurality of contiguous PRUs, the PRU set comprises PRUs whose total number is equal to the number of the plurality of contiguous PRUs included in one subband, and the mapping to the PRU is performed based on the maximum number of PRU sets and the number of PRU sets mapped to the subband PRU, wherein the mapping to the PRU is based on Equation (E-5):

$$PRU_{SB}[j]=PRU[i], j=0, 1, \ldots, L_{SB}-1 \qquad (E-5),$$

where i is expressed by Equation (E-6):

$$i = N_1 \cdot \left\{ \left\lceil \frac{N_{sub}}{K_{SB}} \right\rceil \cdot \left\lfloor \frac{j}{N_1} \right\rfloor + \left\lfloor \left\lfloor \frac{j}{N_1} \right\rfloor \cdot \frac{GCD\left(N_{sub}, \left\lceil \frac{N_{sub}}{K_{SB}} \right\rceil\right)}{N_{sub}} \right\rfloor \right\} \bmod\{N_{sub}\} + \quad \text{(E-6)}$$

$$\{j\} \bmod \{N_1\},$$

where i denotes an index of a PRU, j denotes an index of a subband PRU, $L_{SB}$ denotes the number of PRUs mapped to the subband PRU, $N_1$ denotes the number of PRUs included in one PRU set, $N_{sub}$ denotes the maximum number of PRU sets, and $K_{SB}$ denotes the number of PRU sets mapped to the subband PRU.

5. A data processing method of a user equipment in a wireless communication system, the method comprising:
   receiving data by using a PRU; and
   mapping the PRU to a subband PRU in a granularity of a PRU set,
   wherein the subband PRU is allocated with at least one subband comprising a plurality of contiguous PRUs, the PRU set comprises PRUs whose total number is equal to the number of the plurality of contiguous PRUs included in one subband, and the mapping to the subband PRU is performed based on the maximum number of PRU sets and the number of PRU sets mapped to the subband PRU,
   wherein the mapping to the subband PRU is based on Equation (E-7):

$$PRU_{SB}[j] = PRU[i], j = 0, 1, \ldots, L_{SB} - 1 \quad \text{(E-7)},$$

where i is expressed by Equation (E-8):

$$i = N_1 \cdot \left\{ \left\lceil \frac{N_{sub}}{K_{SB}} \right\rceil \cdot \left\lfloor \frac{j}{N_1} \right\rfloor + \left\lfloor \left\lfloor \frac{j}{N_1} \right\rfloor \cdot \frac{GCD\left(N_{sub}, \left\lceil \frac{N_{sub}}{K_{SB}} \right\rceil\right)}{N_{sub}} \right\rfloor \right\} \bmod\{N_{sub}\} + \quad \text{(E-8)}$$

$$\{j\} \bmod \{N_1\},$$

where i denotes an index of a PRU, j denotes an index of a subband PRU, $L_{SB}$ denotes the number of PRUs mapped to the subband PRU, $N_1$ denotes the number of PRUs included in one PRU set, $N_{sub}$ denotes the maximum number of PRU sets, and $K_{SB}$ denotes the number of PRU sets mapped to the subband PRU.

6. An apparatus, comprising:
   a radio frequency (RF) unit for transmitting and receiving a radio signal; and
   a processor operatively coupled to the RF unit and configured to:
   divide physical resource units (PRUs) into a plurality of PRU sets; and
   map the PRUs to a subband PRU or a miniband PRU in a granularity of the PRU set,
   wherein the PRU set comprises a plurality of contiguous PRUs, and the mapping is based on the greatest common divisor of $N_{sub}$ and a value x, where $N_{sub}$ denotes the maximum number of PRU sets and the value x is based on $K_{SB}$ which denotes the number of PRU sets mapped to the subband PRU.

* * * * *